United States Patent Office 3,546,260
Patented Dec. 8, 1970

3,546,260
AROMATIZED A-RING STEROID
Samuel C. Pan, Metuchen, Pacifico A. Principe, South River, and Leonard J. Lerner, New Brunswick, N.J., assignors to E. R. Squibb & Sons, Inc., New York, N.Y., a corporation of Delaware
No Drawing. Filed Mar. 4, 1968, Ser. No. 709,862
Int. Cl. C07c *169/08*
U.S. Cl. 260—397.45                 12 Claims

ABSTRACT OF THE DISCLOSURE

The invention disclosed herein relates to aromatization of the A-ring in a cyclopentanophenanthrene nucleus by microorganisms. The novel steriods of this invention have the following formula

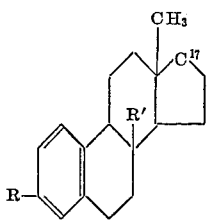

wherein R is hydroxy or acyloxy; R' is hydroxy and $C^{17}$ is

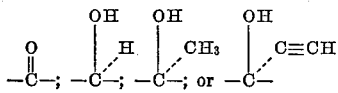

These compounds are prepared by subjecting 8β-hydroxy phenanthrene derivatives to the action of various microorganisms. Both the hydroxy and the acyloxy derivatives of the instant invention possess estrogenic activity and may be utilized in humans and in animals.

---

This invention relates to novel steroids having the formula

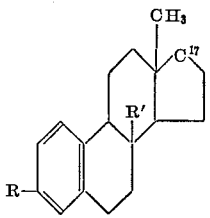

wherein R is hydroxy or acyloxy; R' is hydroxy and $C^{17}$ is

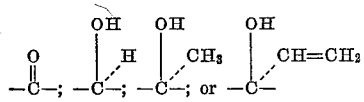

wherein the acyl is derived from a carboxylic acid, preferably the acyl radical of a hydrocarbon carboxylic acid of less than thirteen carbon atoms, as exemplified by the alkanoic acids (e.g., acetic, propionic, butyric, enanthic and lauric acid), the alkenoic acids, the monocyclic aryl carboxylic acids (e.g., benzoic and m-toluic acid), the monocyclic aryl lower alkanoic acids (e.g., phenylacetic and β-phenylpropionic acid), the cycloalkanecarboxylic acids and the cycloalkenecarboxylic acids.

It is the general object of the invention to provide novel compounds which are useful as intermediates in the preparation of the novel estrogenic hormones herein. The objects of this invention are accomplished by subjecting 19-nor steroids having the formula

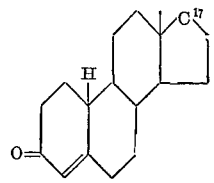

wherein $C^{17}$ is as defined above to the action of enzymes of the microorganisms, *Corynespora melonis* and *Corynespora cassiicola*. This forms the 8β-hydroxy intermediate of the instant invention. This intermediate is then subjected to enzymes of the microorganism *Corynebacterium simplex* to form the aromatized end products of this invention.

Other starting reactants of this invention that can be utilized are 19-norandrostenedione; 19-nor-17α-methyltestosterone; and 19-nor-17α-ethynyltestosterone.

It has been found that a 1-dehydro-generator microorganism for A-ring aromatization can be utilized in the practice of this invention, even though the 10-position is unsubstituted. In addition to the microorganism which may be utilized as set forth above, other organisms as 1-dehydro-generators are: *Nocardia restrictus* (ATCC 14,887); *Pseudomonas testosteroni* (ATCC 11996); *Cylindrocarpon radicicola* (ATCC 11011); *Mycobacterium rhodochrous* (ATCC 4277).

In general, the conditions of culturing the microorganisms of this invention are the same as those of culturing various other bacteria for the production of organic acids or glycols, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose starch or dextrin), a fatty acid, a fat and/or the steroid itself. Preferably, however, the medium includes an assimilable source of carbon and energy in addition to the steroid. The source of nitrogenous factors may be organic (e.g., soybean meal, corn steep liquor, meat extract and/or distillers' solubles) or synthetic (i.e., composed of simple, synthesizable organic and inorganic compounds such as ammonium salts, alkali nitrates, amino acids or urea).

An adequate sterile air supply should be maintained during fermentation, for example by the conventional methods of exposing a large surface of the medium to air or by utilizing submerged aerated culture. The steroid may be added to the culture during the incubation period, or included in the medium prior to sterilization or inoculation.

The compounds of this invention can be utilized as estrogenic gonadotrophin inhibitory agents and are useful in replacement therapy in the menopause and also in the control of fertility in women and in animals. These compounds also have anti-estrogenic activity. They can be tableted by known methods and administered in from 0.10 mg. to 10.0 mg./kg. of body weight per day administered to humans and from 0.05 mg. to 5 mg./kg. of body weight per day when administered to animals (e.g., cows).

The compounds can be administered in tablet form as stated above or as an injectable. In such a case they are dissolved in a vegetable oil (e.g., sesame) or saline and administered parenterally.

The following examples illustrate the invention (all temperatures being in degrees centigrade).

EXAMPLE 1

8β-hydroxy-19-nor-Δ⁴-androstene-3,17-dione (A) *Fermentation.*—Surface growth from each of four 10-day old agar slant cultures of *Corynespora melonis* (CBS), Centraal Bureau voor Schimmel Cultures, Baarn, Netherlands, the slant containing as a nutrient medium (A):

| | Grams |
|---|---|
| Oatmeal | 20 |
| Tomato paste, add to 500 ml. boiling tap water | 20 |
| Agar | 15 |

Tap water, 500 ml.

is suspended in 5 ml. of a 0.01% sodium lauryl sulfate aqueous solution. One ml. portions of the suspension are used to inoculate twelve 250 ml. conical flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |

Distilled water to 1 liter.

After seventy-two hours of incubation at 25° C. with continuous rotary agitation (280 cycles/minute; 2-inch stroke) 5% (vol./vol.), transfers are made to eighty 250 ml. conical flasks each containing 50 ml. of the following sterilized medium (C):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |

Distilled water to 1 liter.

After twenty-four hours of incubation, using the same conditions as described above, the steroid (500 micrograms/ml.) is added by supplementing each flask with 0.25 ml. of a sterile solution (100 mg./ml.) of 19-nor-Δ⁴-androstene-3,17-dione in N,N-dimethylformamide. A total of 2.0 gm. is fermented. After six hours of further incubation using identical conditions as described above, the fermentation is harvested. The contents of the flasks are pooled to give a total volume of 4500 ml.

(B) *Isolation and characterization.*—The combined fermentation broth is extracted three times with 900 ml. portions of chloroform. The combined chloroform extracts are washed with water, dried over anhydrous sodium sulfate and concentrated to dryness under vacuum, leaving about 900 mg. of crude product. This material is chromatographed on twenty-four 16-inch x 8-inch glass plates coated with a thin layer of Silica Gel GF (Merck), 1 mm. in thickness, with chloroform containing 5% (by volume) methanol as the developing solvent. The UV-absorbing band, moving with 7/10 the mobility of the substrate, i.e., 19-norandrostenedione, is eluted with a 1:1 (by volume) mixture of methanol and chloroform. After evaporating off the solvent, the residue is partitioned between chloroform and a 1:1 (by volume) mixture of water and methanol. The chloroform phase, upon evaporation under vacuum to dryness, yields crystalline 8β-hydroxy-19-nor-Δ⁴-androstene-3,17-dione. It is recrystallized from acetone-hexane to yield the pure product, M.P. about 208–210°;

$\lambda_{max}^{CDCl_3}$ 3605, 1731, 1654, 1600 c.m.⁻¹;

$\tau_{TMS}^{CDCl_3}$ 8.82, 4.17 p.p.m.

EXAMPLE 2

Following the procedure of Example 1, but substituting an equivalent amount of 19-nortestosterone for the 19-nor-Δ⁴-androstene-3,17-dione, 8β-hydroxy-19-nortestosterone is obtained.

Following the procedure of Example 2 but utilizing the indicated substrate in lieu of 19-nor-Δ⁴-androstene-3,17-dione, the indicated product is obtained.

| Steroid substrate: | Product |
|---|---|
| 19-nor-17α-methyl-testosterone. | 8β-hydroxy-9-nor-17-α-methyltestosterone. |
| 19-nor-17α-ethynyl-testosterone. | 8β-hydroxy-19-nor-17-α-ethynyltestosterone. |

EXAMPLE 3

8β-hydroxyestrone by growing culture of *Corynebacterium simplex*

(A) *Fermentation.*—Surface growth from a two-week old agar slant of *Corynebacterium simplex* (ATCC 6946), the slants containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate two 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |

Distilled water to 1 liter.

After twenty-four hours of incubation at 25° C. with continuous rotary agitation (280 cycles/minute; 2-inch stroke), 5% (vol./vol.) transfers are made to two 250 ml. Erlenmeyer flasks, each containing 50 ml. of freshly sterilized medium B. After twenty-four hours of further incubation, using the same conditions as described above, the steroid (500 micrograms/ml.) is added by supplementing each flask with 0.25 ml. of a sterile solution (100 mg./ml.) of 8β-hydroxy-19-nor-Δ⁴-androstene-3,17-dione in N,N-dimethylformamide. A total of 50 mg. is fermented. After forty-eight hours of further incubation, using identical conditions as described above, the contents of the flasks are pooled, and the broth is extracted three times with 50 ml. portions of methyl isobutyl ketone. Upon evaporation of the combined extract under vacuum to dryness, crystalline 8β-hydroxyestrone is obtained. It is recrystallized twice from acetone-hexane to yield about 40 mg. of the pure product, M.P. 260° (dec.), $\lambda_{max}^{KBr}$ 3565, 3370, 1720, 1606, 1580 (sh.) 1504 c.m.⁻¹

EXAMPLE 4

8β-hydroxyestrone by washed cells of *Corynebacterium simplex*

Following the procedure of Example 3 with the exception that testosterone is used in place of 8β-hydroxy-19-norandrostenedione, the cells of the culture of *Corynebacterium simplex* are harvested at the end of seventy-two hours by centrifugation. The packed cells are washed three times with a phosphate buffer containing 0.005 mole each of $KH_2PO_4$ and $Na_2H_2P_2O_7$ per liter and adjusted to pH 7.0. The washed cells are then suspended in the same phosphate buffer to a volume equal to one-quarter of the volume of the original culture. The substrate, 8β-hydroxy-19-norandrostenedione and the hydrogen acceptor, e.g., 2-methyl-naphthoquinone are added as their solutions in ethanol to give final concentrations of 100 μg./ml. and 0.4 mM., respectively, the quantity of ethanol introduced being held within 5% of the total. The reaction mixture is allowed to stand at 30° for four to six hours, after which it is extracted twice with one-quarter of its volume of methyl isobutyl ketone. The methyl isobutyl ketone extract is processed in exactly the same manner as described in Example 3 to give pure 8β-hydroxyestrone of M.P. 260° (dec.).

EXAMPLE 5

8β-hydroxyestrone by acetone-dried cells of *Corynebacterium simplex*

Following the procedure of Example 4, the packed cells are diluted with an equal volume of phosphate buffer of pH 7.0. This cell suspension is added dropwise, with constant stirring, into ten times its volume of acetone which is chilled at a temperature not above 5° C. The deposit on the bottom is immediately filtered on a Buchner funnel with suction, washed with a small volume of acetone and then air dried. A suspension of 10 mg. of the acetone-dried cells per ml. of the pH 7.0 buffer prepared by blending the cells with the buffer in a Waring blender is used in place of the suspension of the washed cells in the Example 4. The substrate and the hydrogen acceptor are added in the same manner as described therein. Following the same procedure for incubation, extraction, and so forth, we also obtain 8β-hydroxyestrone in crystalline form, M.P. 260° (dec.).

EXAMPLE 6

8β-hydroxyestrone by cell-free enzyme preparation from *Corynebacterium simplex*

Following the procedure of Example 4, the packed cells are placed in a mortar along with an equal amount of weight of alumina (finely powdered) and treated in a Raytheon magnetostrictive oscillator for twenty minutes. The sonicated mixture is centrifuged for ten minutes at 2000×G to remove the cell debris and alumina.

8β-hydroxy-19-norandrostenedione (1 mg.), 2-methyl-naphthoquinone (500 μg.) and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is twice extracted with 1 ml. of methyl isobutyl ketone. The combined extract is chromatographed on paper using ethylene glycol as the stationary phase and a mixture of equal volumes of benzene and chloroform as the mobile phase. A spot moving with the same $R_f$ (0.19) and exhibiting the same characteristic color reactions as the 8β-hydroxyestrone obtained in Example 3 is observed.

Similarly, by following the procedures of Examples 3, 4, 5 or 6, but substituting 8β-hydroxy-19-nor-17α-methyltestosterone, 8β-hydroxy-19-nor-17α-ethynyltestosterone, and 8β-hydroxy-19-nortestosterone for the 8β-hydroxy-19-nor-Δ⁴-androstene-3,17-dione, the corresponding 8β-hydroxyestrane derivatives are obtained.

The invention may be variously otherwise embodied within the scope of the appended claims.

What is claimed is:

1. A compound having the formula

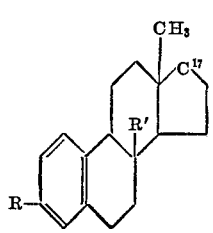

wherein R is hydroxy or acyloxy; R' is hydroxy and $C^{17}$ is

2. A compound having the name 8β-hydroxy-19-nor-Δ⁴-androstene-3,17-dione.

3. A compound having the name 8β-hydroxy-19-nortestosterone.

4. A process for 8-hydroxylating a steroid of the formula

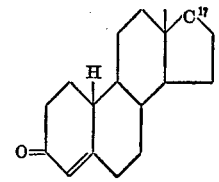

wherein $C^{17}$ is as defined in claim 1, which comprises subjecting said steroid to the action of enzymes of the microorganism *Corynespora melonis* and *Corynespora cassiicola*.

5. The process in accordance with claim 4 wherein the steroid is a 19-nor-androstenedione.

6. A process in accordance with claim 4 wherein the steroid is a 19-nor-17α-methyltestosterone.

7. A process in accordance with claim 4 wherein the steroid is a 19-nor-17α-ethynyltestosterone.

8. A process of preparing a compound as defined in claim 1, which comprises subjecting a steroid of the formula

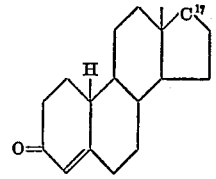

wherein $C^{17}$ is as defined in claim 1, to the action of enzymes of a microorganism selected from the group consisting of *Corynespora melonis* and *Corynespora cassiicola*, to form the corresponding 8β-hydroxy derivative, and subjecting the 8β-hydroxy derivative to the action of a 1-dehydro-generator selected from the group consisting of *Corynebacterium simplex*, *Nocardia restrictus*, *Pseudomonas testosteroni*, *Cylindrocarpon radicicola*, and *Mycobacterium rhodochrous*.

9. A compound in accordance with claim 1 having the name 8β-hydroxyestrone.

10. A compound in accordance with claim 1 having the name 8β-hydroxyestradiol.

11. A compound having the formula:

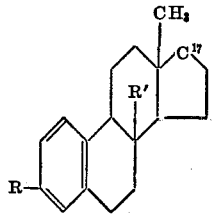

wherein R is hydroxy or acyloxy, R' is hydroxy, and $C^{17}$ is

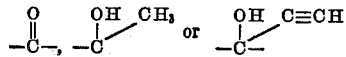

12. A compound having the formula:
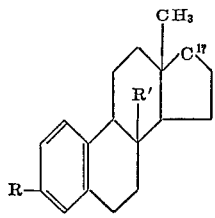
wherein R is acyloxy, R' is hydroxy and $C^{17}$ is
References Cited
UNITED STATES PATENTS
3,436,411    4/1969    Stein et al. _____ 260—397.5
OTHER REFERENCES
Djerassi: Steroid Reactions, 1963, pp. 392–393.
HENRY A. FRENCH, Primary Examiner
U.S. Cl. X.R.
195—51; 260—397.5, 999